(12) United States Patent
Chalasani et al.

(10) Patent No.: US 12,417,235 B2
(45) Date of Patent: Sep. 16, 2025

(54) UNIVERSAL ADAPTER FOR VENDOR DATA

(71) Applicant: Wells Fargo Bank, N.A., San Francisco, CA (US)

(72) Inventors: Nalini Krishna Teja Chalasani, Edison, NJ (US); Maximilian Fuchs, Charlotte, NC (US); Dinesh Jagadeesan, Edison, NJ (US); Kaustubh Kondhawekar, Edison, NJ (US); Vito A. Marchiano, Staten Island, NY (US); Ryan Charles Strid, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 51 days.

(21) Appl. No.: 18/516,059

(22) Filed: Nov. 21, 2023

(65) Prior Publication Data

US 2025/0165496 A1    May 22, 2025

(51) Int. Cl.
*G06F 15/16* (2006.01)
*G06F 16/2455* (2019.01)
*G06F 16/27* (2019.01)

(52) U.S. Cl.
CPC .......... *G06F 16/27* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 9,460,415 B2 | 10/2016 | Brunswig et al. | |
| 9,483,329 B2 | 11/2016 | Ritter et al. | |
| 9,990,383 B2 | 6/2018 | Brinnand | |
| 10,802,889 B1 | 10/2020 | Ganesan et al. | |
| 2018/0039761 A1 | 2/2018 | Gaskin et al. | |
| 2018/0288169 A1 | 10/2018 | Shi et al. | |
| 2020/0184535 A1 | 6/2020 | Barkan et al. | |
| 2022/0131879 A1* | 4/2022 | Naik | H04L 63/1416 |

(Continued)

FOREIGN PATENT DOCUMENTS

| | | |
|---|---|---|
| CN | 104950741 | 9/2015 |
| CN | 108701255 | 10/2018 |
| CN | 115168363 | 10/2022 |

OTHER PUBLICATIONS

Kordowski, Jens, "Cloud Integration What You Need to Know About the Kafka Adapter", [Online]. Retrieved from the Internet: https: community.sap.com t5 technology-blogs-by-sap cloud-integration-what-you-need-to-know-about-the-kafka-adapter ba-p 13495070, (Accessed on Aug. 1, 2023), 49 pages.

(Continued)

*Primary Examiner* — Phuoc H Nguyen
(74) *Attorney, Agent, or Firm* — SCHWEGMAN LUNDBERG & WOESSNER, P.A.

(57) ABSTRACT

An electronic online system is configured to receive, at the electronic online system, an expression of a use case; determine, using a first machine-learning technique with the expression of the use case as input, a data source to satisfy the use case; determine, using a second machine-learning technique with the expression of the use case and the inference of the first machine-learning technique as inputs, a data destination to satisfy the use case; and construct a data pipeline from the data source to the data destination for the use case.

20 Claims, 4 Drawing Sheets

(56) References Cited

U.S. PATENT DOCUMENTS

| | | |
|---|---|---|
| 2023/0222104 A1 | 7/2023 | Filho et al. |
| 2023/0222454 A1* | 7/2023 | Cella .................. G06N 7/01 |
| | | 705/28 |
| 2023/0289443 A1* | 9/2023 | Sinha .................. G06F 11/004 |
| 2024/0106848 A1* | 3/2024 | Thorve .............. G06F 3/04845 |

OTHER PUBLICATIONS

Limburn, Jay, "Egeria open source standard enhances hybrid cloud metadata and data governance initiatives", [Online]. Retrieved from the Internet: https: www.ibm.com blog egeria-open-source-standard-enhances-hybrid-cloud-metadata-and-data-governance-initiatives , (Accessed on Aug. 2, 2023), 9 pages.

Repina, Ksenia, "Dataflow Adapter A Tool for Integrating Legacy Applications into Distributed Stream Processing", 2018 IEEE ACM International Conference on Utility and Cloud Computing Companion (UCC Companion). IEEE, 2018., (Dec. 17, 2018), 3 pages.

Zehnder, Philipp, "Automating Industrial Event Stream Analytics Methods, Models, and Tools", Diss. Karlsruhe Institute of Technology, Germany, 2021, (Sep. 23, 2021), 187 pages.

\* cited by examiner

UNIVERSAL ADAPTER FOR VENDOR DATA

BACKGROUND

Large organizations are generally made up of many separate business units. Each business unit may engage various vendors to provide services to the business unit and the organization. Data provided by the vendors require large amounts storage space and the operation of multiple applications on various company and personal computing devices. Even where a central administrative department handles vendor data, large organizations fail to leverage the full potential of the data generated by diverse computing systems, programs, and devices used within the organization.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide a vendor data management system. Vendor data is data about, produced by, or used by a vendor of an organization. Vendors may be various people, organizations, or other entities that provide products or services to an organization. Vendors may be contractors, partners, or have other relationships with the organization.

In an organization, many vendors may be used to provide various products or services. In the context of a banking organization, vendors may provide information, such as stock prices, bid or ask prices, currency exchange rates, lending rates, dividend rates or amounts, expenses or earnings reports, or the like. Each vendor may use its own data format, database schema, or message format to convey the information. This type of diversity creates inefficiencies when business units in an organization need to convert the same vendor data to their own format for use.

The embodiments described herein solve the technical and internet-centric problem of deciphering and standardizing large amounts of vendor information for use across an organization. A data adapter is used to modify raw data received from a vendor and transform it organization data. The data adapter is universal and is able to transform data from a wide range of vendor data sources to the organization data. Organization data is then accessible using systems, methods, application programming interfaces (API), and devices that understand a consistent data schema that is used throughout the organization.

In some embodiments, the data adapter is composed of a plurality of data adapters and a controller. In response to a request for information, the controller is able to select, configure, or manage the plurality of data adapters to determine where to obtain information and create a pipeline for the information to the requester. The pipeline may be a subscription-based data feed.

In some embodiments, the controller is implemented using machine learning. The machine learning may use the request for information, which may be in an unstructured format, and determine an adapter pipeline to obtain the relevant data. These functions and others are described in more detail below.

Figure 1:
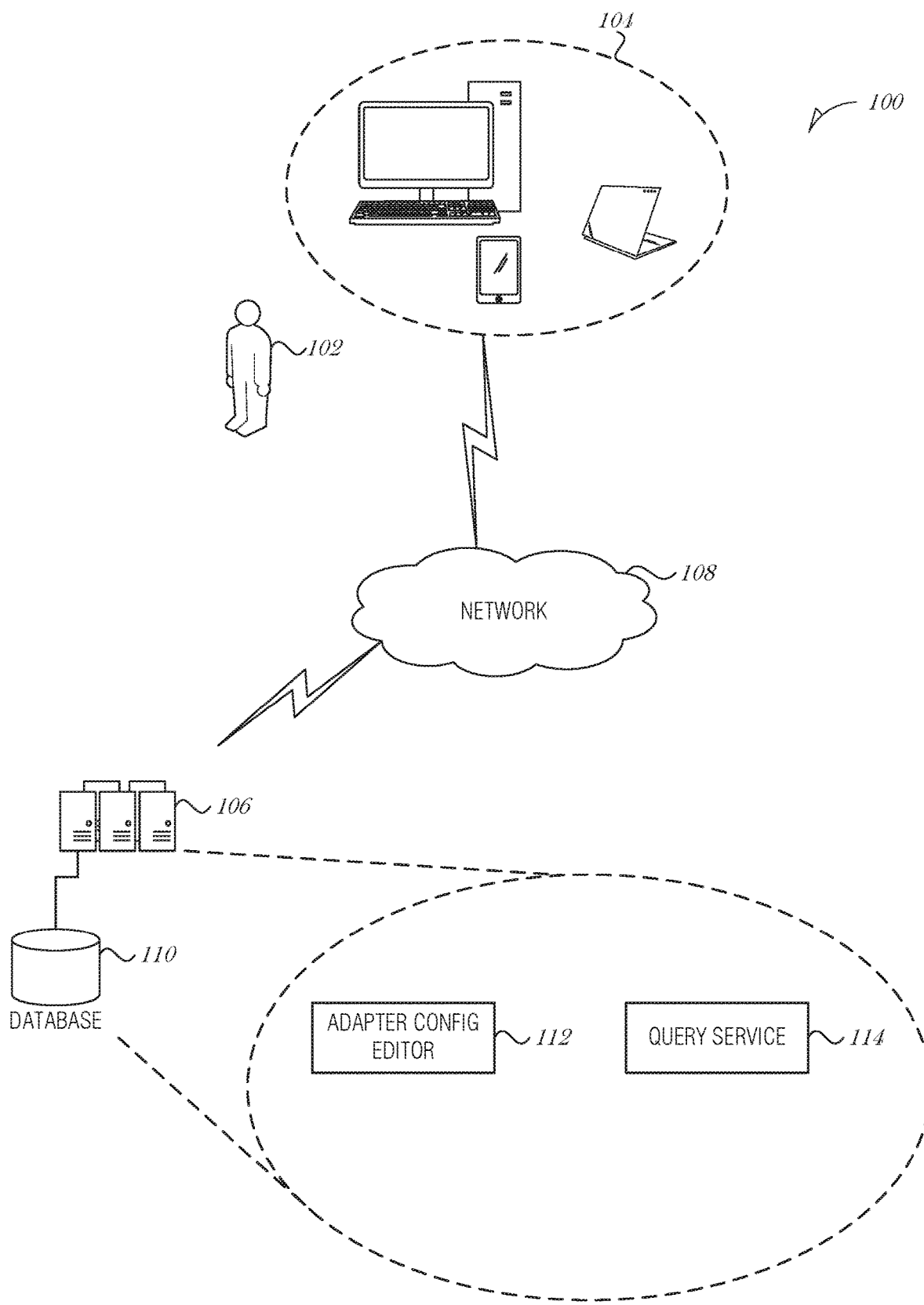
FIG. 1 is a diagram illustrating an operating environment, according to an embodiment.

FIG. 1 is a diagram illustrating an operating environment 100, according to an embodiment. A user 102 may use a user device 104 to access a vendor data management system 106. The user device 104 may be of any type of form factor including, but not limited to a desktop computer, a mobile device, a laptop computer, a smartphone, a tablet device, a personal digital assistant, or the like. The user 102 may be a person who fulfils a role, such as a system administrator, a business executive, a group manager, business unit administrator, financial advisor, or the like. Each role may have different permissions to execute functions or operations in the vendor data management system 106. For instance, an administrator may be allowed to create a new data adapter configuration, delete an existing data adapter configuration, or revise a data adapter configuration. A person with a non-elevated privilege (e.g., a regular user) may only have permissions to submit requests to the vendor data management system 106.

The vendor data management system 106 may include various web servers, database servers, proxy devices, firewalls, storage devices, and network devices. The vendor data management system 106 may provide a web-based interface accessible via a uniform resource locator (URL). The vendor data management system 106 may provide various levels of security, such as requiring an account with a username and password, a secure channel (e.g., HTTPS), two-factor authentication, and the like.

To connect to the vendor data management system 106, the user 102 may execute an application ("app") to connect via a network 108. The app may be an internet browser application. In various examples, the servers and components in the operating environment 100 may communicate via one or more networks such as network 108. The network 108 may include one or more of local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 108 may include a single local area network (LAN) or wide-area network (WAN), or combinations of LANs or WANs, such as the Internet.

Data used in the vendor data management system 106 may be organized and stored in a variety of manners. For convenience, the organized collection of data is described herein as a database 110. The specific storage layout and model used in the database 110 may take a number of forms-indeed, the database 110 may utilize multiple models.

The database 110 may be, but is not limited to, a relational database (e.g., SQL), non-relational database (NoSQL), a flat file database, object model, document details model, or a file system hierarchy. The database 110 may be implemented using MongoDB using a JavaScript Object Notation (JSON) data format. The database 110 may store data on one or more storage devices (e.g., a hard disk, random access memory (RAM), etc.). The storage devices may be in standalone arrays, part of one or more servers, and may be located in one or more geographic areas.

A database management system (DBMS) may be used to access the data stored within the database 110. The DBMS may offer options to search the database 110 using a query and then return data in the database 110 that meets the criteria in the query. The DBMS may be implemented, at least in part, with MongoDB Atlas. The DBMS may operate on one or more of the components of the cloud configuration management system 106.

In operation, a user 102 may log into the vendor data management system 106 to create or modify data adapter configurations, data stream processors, or database configurations. Depending on the privileges and the role of the user 102, various components of the vendor data management system 106 are visible and accessible. Example components include an adapter configuration editor 112 and a query service 114. A user 102 may have access to one or more of these components 112-114.

The adapter configuration editor 112 is used to create, revise, and delete adapter configurations. An adapter configuration includes parameters for a data streaming processor. Data streaming processors may be implemented using microservices, database stored procedures, DMBS processes, or the like. The data streaming processor may be configured to use one or more machine-learning models to determine a data adapter pipeline for use in transforming data from a vendor-specific format to an organization-preferred format. Models may be trained to recognize vendor-specific formats and then identify a preferred organization format for particular use cases. Using the inference provided by the model, a pipeline is configured to transform the data from the vendor-specific format to the organization-preferred format. For instance, a data streaming processor may ingest vendor data stored in a SQL relational database and transform it into organization data for storage in a MongoDB collection (as JSON documents). In an embodiment, a data streaming processor is implemented using Apache Kafka Connectors.

The query service 114 is used by a user 102 to accept queries or requests from a user 102 and configure underlying mechanisms in the vendor data management system 106 to obtain the data needed to satisfy the query. The query may be in a natural language format. The query may not include the data sources or specific types of data. Instead, the query service 114 is configured to receive a query, parse the query, and determine where to obtain the data to satisfy the query based on the context of the query and other factors. The query service 114 may implement one or more machine-learning techniques to determine data sources, data destinations, query parsing, or the like. The query service 114 may interact with the adapter configuration editor 112 to create, revise, or modify adapter configurations. The query service 114 and the adapter configuration editor 112 may be provided in a shared user interface for a user 102. In this manner, the user 102 may be able to create a new data pipeline based on a query with the query service 114, and then finetune the data pipeline using the adapter configuration editor 112. The adapter configuration editor 112 and data streaming processor may be collectively referred to as a data pipeline orchestrator.

The vendor data management system 106 provides mechanisms to transform data from a vendor-specific raw format to a format that is used within an organization. The data streaming processors are vendor agnostic and data-use agnostic. The data streaming processors are able to ingest any vendor data and output data for an identified use case. Machine learning models may be used to determine (e.g., select or configure) a data streaming processor for a particular use case. Additional automatic processes, which may use machine-learning techniques, may be used to determine data sources for a particular use case without the user having to explicitly specify the data source. In this manner, when a user requests data generally, such as in a query "provide the best loan rates for a 30 year mortgage," vendor data that is able to provide loan rates is selected as the data source.

Figure 2:
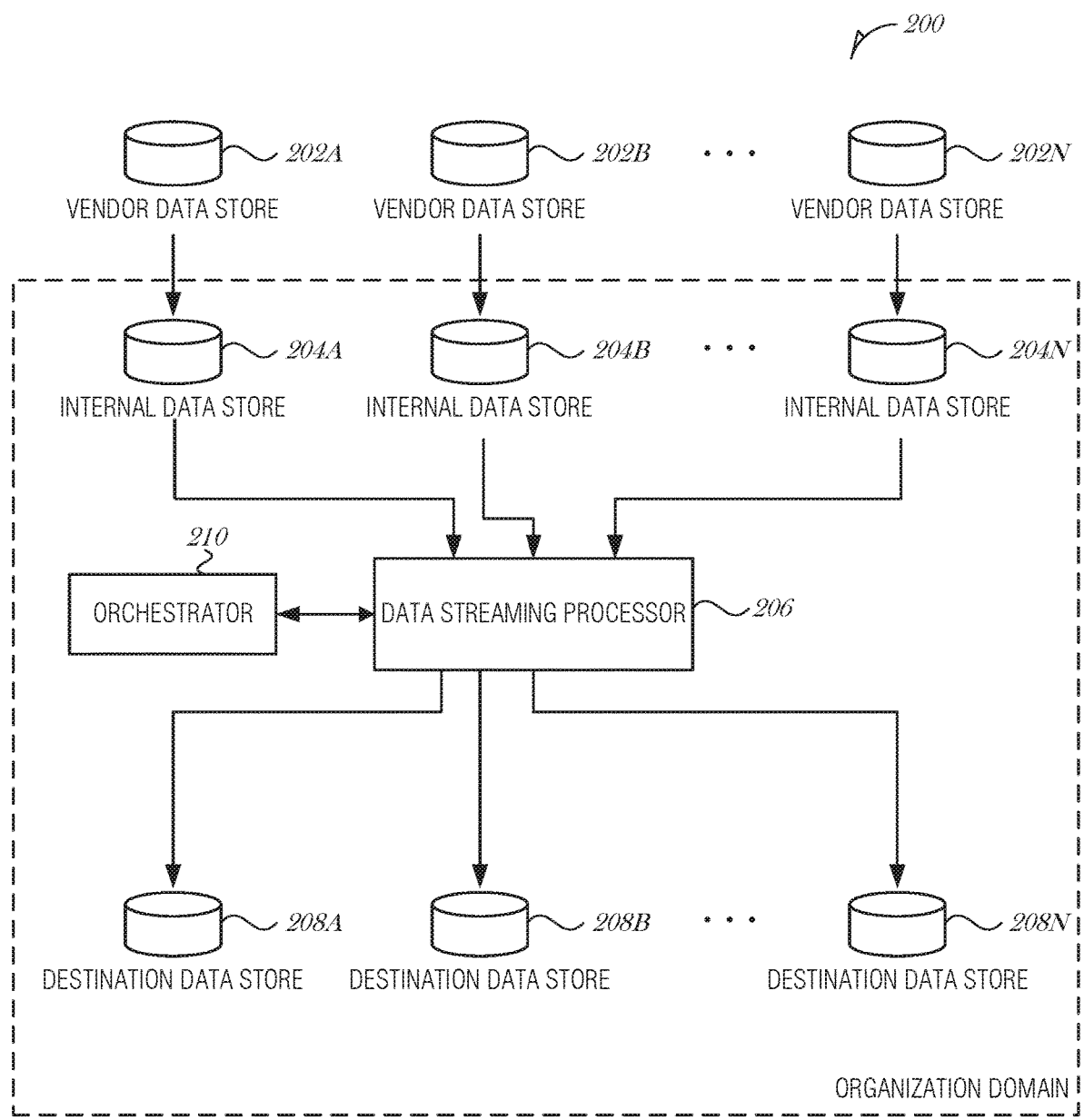
FIG. 2 is a block diagram illustrating control and data flow for data adaptation, according to an embodiment.

FIG. 2 is a block diagram illustrating control and data flow 200 for data adaptation, according to an embodiment. Vendor data is stored at one or more external data stores 202A-N. The vendor data stores 202A-N are replicated to internal data stores 204A-N. The replicated internal data stores 204A-N may be synchronized on a regular basis to ensure that the internal data sources 204A-N accurately reflect up-to-date revisions of the vendor data sources 202A-N. For instance, a change data capture (CDC) process may be used to identify and capture changes made to data in the vendor data source 202A-N and then relay those changes in real-time to update the corresponding internal data source 204A-N.

A data streaming processor 206 interfaces with the internal data stores 204A-N to obtain data. The data streaming processor 206 may be configured to perform stream processing, manage data pipelines, and integrate with an organization's network to distribute data across multiple nodes for a highly available deployment. The data streaming processor 206 may be configured to collect and process large amounts of data from the internal data stores 204A-N and then deliver results to various destinations. The data streams may be managed using filters, transformations, and aggregations in real-time. The data streaming processor 206 may operate on a publish and subscribe (pub/sub) model where data is published to any number of systems or real-time applications. In an embodiment, the data streaming processor 206 is Apache Kafka, which is capable of managing data pipelines by ingesting data from sources into Kafka as it is created and then streaming that data from Kafka to one or more destinations. The pub/sub model may implement the concept of topics, where subscribers are able to subscribe to a topic in Kafka and Kafka publishes data to certain topics based on how the topic is configured. In Kafka, Kafka Connectors are used to connect with data stores for both data ingesting and exporting.

One or more destination data stores 208A-N are targets of the data streaming processor 206. The destination data stores 208A-N may include a database, such as a Mongo database, which is configured to serve a particular group of the organization (e.g., a business unit in a corporation) or a particular use case (e.g., application or platform used by one or more business units).

In an embodiment, when a destination data store 208A-N is updated by the data streaming processor 206, changes to data may be reflected in an end application or user interface by pushing changes automatically from the destination data store 208A-N to the end application or user interface. This may be performed using Representational State Transfer (REST) APIs, for instance.

Both internal data stores 204A-N and destination data stores 208A-N may be of any type of database structure including but not limited to SQL databases (e.g., Microsoft SQL Server, MySQL, Oracle Database, Sybase, PostgreSQL, etc.) or NoSQL databases (e.g., MongoDB, CouchDB, Oracle NoSQL, Apache HBase, Redis, Firebase, etc.). Internal data stores 204A-N are typically of the same type of database structure as the database being replicated (e.g., the corresponding vendor data store 202A-N), however, this is not a requirement and the internal data store 204A-N may be of a different type of database structure with replication being supported with a transformation function or an ETL function. The database structure used for destination data stores 208A-N is driven by the business use case for the particular destination data store 208A-N. As such, regardless of the database structure used for the internal data stores 204A-N, the destination data stores 208A-N may be optimally designed for a particular use case.

An orchestrator 210 is used to configure the data streaming processor 206 to create ingest connections between the data streaming processor 206 and the internal data stores 204A-N, and export connections between the data streaming processor 206 and the destination data stores 208A-N. The orchestrator 210 may be implemented to use, at least in part, machine-learning techniques to determine data sources, data sinks, and data transformations needed for a particular use case. The orchestrator 210 may access a use case (e.g., a business need), which may be formatted as either structured data or unstructured data. The use case may include a question, a query, a task, a business objective, or the like. Based on the use case, the orchestrator 210 determines which of the internal data stores 204A-N are needed to obtain the data relevant to the use case, which filters, transformations, or aggregations are needed to produce the relevant output data, and where to store the relevant output data (e.g., which destination data stores 208A-N).

In an embodiment, the orchestrator 210 interfaces with a Kafka platform to create one or more topics, determine one or more internal stores 204A-N for data input, configure one or more Kafka Connectors using the internal stores 208A-N, determine subscribing output destination data stores 208A-N, and configure one or more Kafka Connectors to publish data to the subscribing destination data stores 208A-N based on the one or more topics.

The operations of the orchestrator 210 may be implemented using one or more machine-learning techniques to parse the use case to identify an objective, determine a source data store based on an objective of the use case, determine a destination data store based on the use case or contextual factors (e.g., who provided the use case, what the identified business objective is, time of day, etc.), and determine a data pipeline to transform the data from the source data store to output data to be stored in the destination data store.

Figure 3:
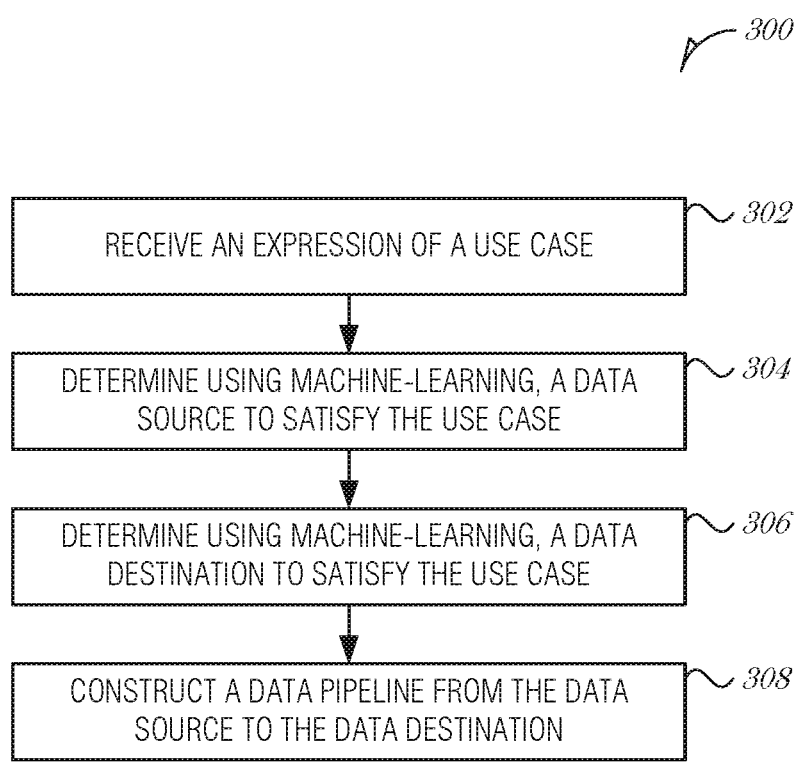
FIG. 3 is a flowchart illustrating a method for configuring a data pipeline, according to an embodiment.

FIG. 3 is a flowchart illustrating a method 300 for configuring a data pipeline, according to an embodiment. The method 300 may be performed by an electronic system (e.g., vendor data management system 106) or any of the modules, logic, circuits, processors, or components described herein.

At 302, an expression of a use case is received at the electronic online system. In various embodiments, the expression of the use case is formed as a query, a business objective, or a description of an output. In an embodiment, the expression of the use case does not include the data source. The data source may be determined by parsing the use case and identifying a data source.

At 304, using a first machine-learning technique with the expression of the use case as input, a data source to satisfy the use case is determined. In an embodiment, the data source includes a database with a SQL database structure. In another embodiment the data source includes a database with a NoSQL database structure.

At 306, using a second machine-learning technique with the expression of the use case and the inference of the first machine-learning technique as inputs, a data destination to satisfy the use case is determined. In an embodiment, the data destination includes a database with a SQL database structure. In another embodiment, the data destination includes a database with a NoSQL database structure.

At 308, a data pipeline from the data source to the data destination is constructed for the use case. In an embodiment, the data pipeline includes an ingest Kafka Connector to obtain data from the data source, an export Kafka Connector to transmit data to the data destination, and a Kafka topic to store the configuration of the ingest Kafka Connector and the export Kafka Connector.

In an embodiment, the data pipeline is a publication-subscription information sharing model with the data destination being a subscriber.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
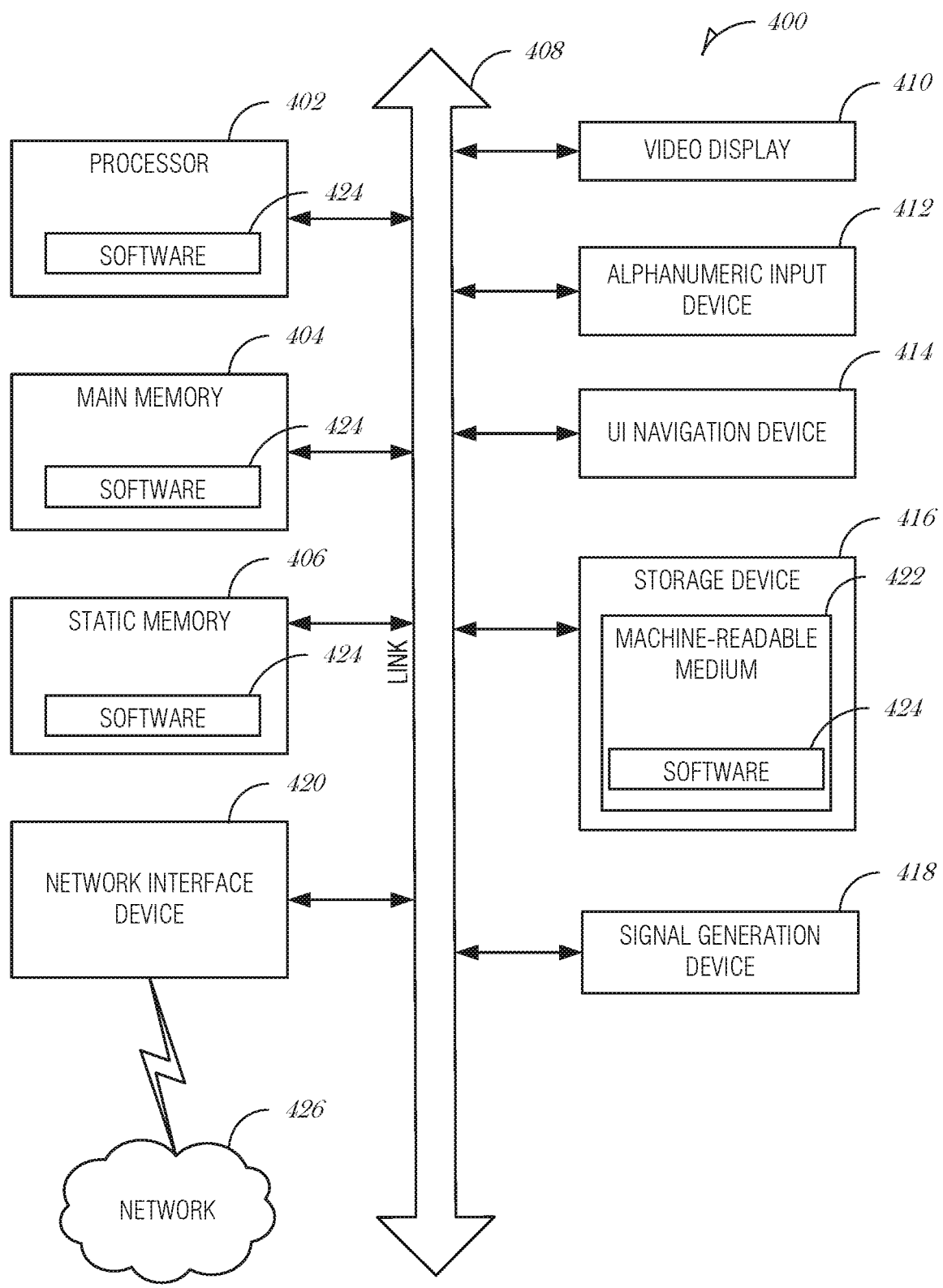
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an electronic online system comprising: a processor subsystem; and a memory including instructions, which when executed by the processor subsystem, cause the processor subsystem to: receive, at the electronic online system, an expression of a use case; determine, using a first machine-learning technique with the expression of the use case as input, a data source to satisfy the use case; determine, using a second machine-learning technique with the expression of the use case and the inference of the first machine-learning technique as inputs, a data destination to satisfy the use case; and construct a data pipeline from the data source to the data destination for the use case.

In Example 2, the subject matter of Example 1 includes, wherein the expression of the use case is formed as a query.

In Example 3, the subject matter of Examples 1-2 includes, wherein the expression of the use case is formed as a business objective.

In Example 4, the subject matter of Examples 1-3 includes, wherein the expression of the use case is formed as a description of an output.

In Example 5, the subject matter of Examples 1-4 includes, wherein the expression of the use case does not include the data source.

In Example 6, the subject matter of Examples 1-5 includes, wherein the data source includes a database with a SQL database structure.

In Example 7, the subject matter of Examples 1-6 includes, wherein the data source includes a database with a NoSQL database structure.

In Example 8, the subject matter of Examples 1-7 includes, wherein the data destination includes a database with a SQL database structure.

In Example 9, the subject matter of Examples 1-8 includes, wherein the data destination includes a database with a NoSQL database structure.

In Example 10, the subject matter of Examples 1-9 includes, wherein the data pipeline includes an ingest Kafka Connector to obtain data from the data source, an export Kafka Connector to transmit data to the data destination, and a Kafka topic to store the configuration of the ingest Kafka Connector and the export Kafka Connector.

In Example 11, the subject matter of Examples 1-10 includes, wherein the data pipeline is a publication-subscription information sharing model with the data destination being a subscriber.

Example 12 is a method performed on an electronic online system, the method comprising: receiving, at the electronic online system, an expression of a use case; determining, using a first machine-learning technique with the expression of the use case as input, a data source to satisfy the use case; determining, using a second machine-learning technique with the expression of the use case and the inference of the first machine-learning technique as inputs, a data destination to satisfy the use case; and constructing a data pipeline from the data source to the data destination for the use case.

In Example 13, the subject matter of Example 12 includes, wherein the expression of the use case is formed as a query.

In Example 14, the subject matter of Examples 12-13 includes, wherein the expression of the use case is formed as a business objective.

In Example 15, the subject matter of Examples 12-14 includes, wherein the expression of the use case is formed as a description of an output.

In Example 16, the subject matter of Examples 12-15 includes, wherein the expression of the use case does not include the data source.

In Example 17, the subject matter of Examples 12-16 includes, wherein the data source includes a database with a SQL database structure.

In Example 18, the subject matter of Examples 12-17 includes, wherein the data source includes a database with a NoSQL database structure.

In Example 19, the subject matter of Examples 12-18 includes, wherein the data destination includes a database with a SQL database structure.

In Example 20, the subject matter of Examples 12-19 includes, wherein the data destination includes a database with a NoSQL database structure.

In Example 21, the subject matter of Examples 12-20 includes, wherein the data pipeline includes an ingest Kafka Connector to obtain data from the data source, an export Kafka Connector to transmit data to the data destination, and a Kafka topic to store the configuration of the ingest Kafka Connector and the export Kafka Connector.

In Example 22, the subject matter of Examples 12-21 includes, wherein the data pipeline is a publication-subscription information sharing model with the data destination being a subscriber.

Example 23 is a non-transitory machine-readable medium comprising instructions, which when executed by a machine in an electronic online system, cause the machine to: receive, at the electronic online system, an expression of a use case; determine, using a first machine-learning technique with the expression of the use case as input, a data source to satisfy the use case; determine, using a second machine-learning technique with the expression of the use case and the inference of the first machine-learning technique as inputs, a data destination to satisfy the use case; and construct a data pipeline from the data source to the data destination for the use case.

In Example 24, the subject matter of Example 23 includes, wherein the expression of the use case is formed as a query.

In Example 25, the subject matter of Examples 23-24 includes, wherein the expression of the use case is formed as a business objective.

In Example 26, the subject matter of Examples 23-25 includes, wherein the expression of the use case is formed as a description of an output.

In Example 27, the subject matter of Examples 23-26 includes, wherein the expression of the use case does not include the data source.

In Example 28, the subject matter of Examples 23-27 includes, wherein the data source includes a database with a SQL database structure.

In Example 29, the subject matter of Examples 23-28 includes, wherein the data source includes a database with a NoSQL database structure.

In Example 30, the subject matter of Examples 23-29 includes, wherein the data destination includes a database with a SQL database structure.

In Example 31, the subject matter of Examples 23-30 includes, wherein the data destination includes a database with a NoSQL database structure.

In Example 32, the subject matter of Examples 23-31 includes, wherein the data pipeline includes an ingest Kafka Connector to obtain data from the data source, an export Kafka Connector to transmit data to the data destination, and a Kafka topic to store the configuration of the ingest Kafka Connector and the export Kafka Connector.

In Example 33, the subject matter of Examples 23-32 includes, wherein the data pipeline is a publication-subscription information sharing model with the data destination being a subscriber.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An electronic system comprising:
a processor subsystem; and
a memory including instructions, which when executed by the processor subsystem, cause the processor subsystem to:
receive, at the electronic system, an unstructured expression of a use case;
automatically determine, using a first trained machine-learning technique with the unstructured expression of the use case as input, a vendor-specific format and a data source to satisfy the use case;
automatically determine, using a second trained machine-learning technique with both (i) the unstructured expression of the use case and (ii) an inference output from the first trained machine-learning technique as inputs, an organization-specific data destination format and a data destination to satisfy the use case;
construct a real-time data pipeline from the data source to the data destination for the use case by:
configuring an ingest connector to obtain vendor data in the vendor-specific format from the data source,
transforming the vendor data from the vendor-specific format to the organization-specific data destination format using the inference output, to obtain transformed data, and
configuring an export connector to transmit the transformed data to the data destination; and
automatically update the data destination in real-time with vendor data through the real-time data pipeline using a publication-subscription model.

2. The electronic system of claim 1, wherein the unstructured expression of the use case is formed as a query.

3. The electronic system of claim 1, wherein the unstructured expression of the use case is formed as a business objective.

4. The electronic system of claim 1, wherein the unstructured expression of the use case is formed as a description of an output.

5. The electronic system of claim 1, wherein the unstructured expression of the use case does not include the data source.

6. The electronic system of claim 1, wherein the data source includes a database with a SQL database structure.

7. The electronic system of claim 1, wherein the data source includes a database with a NoSQL database structure.

8. The electronic system of claim 1, wherein the data destination includes a database with a SQL database structure.

9. The electronic system of claim 1, wherein the data destination includes a database with a NoSQL database structure.

10. The electronic system of claim 1, wherein the real-time data pipeline includes an ingest Kafka Connector to obtain data from the data source, an export Kafka Connector to transmit data to the data destination, and a Kafka topic to store a configuration of the ingest Kafka Connector and the export Kafka Connector.

11. The electronic system of claim 1, wherein the real-time data pipeline is a publication-subscription information sharing model with the data destination being a subscriber.

12. A method performed on an electronic online system, the method comprising:
receiving, at the electronic online system, an unstructured expression of a use case;
automatically determining, using a first trained machine-learning technique with the unstructured expression of the use case as input, a vendor-specific format and a data source to satisfy the use case;
automatically determining, using a second trained machine-learning technique with both (i) the unstructured expression of the use case and (ii) an inference output from the first trained machine-learning technique as inputs, an organization-specific data destination format and data destination to satisfy the use case;
constructing a real-time data pipeline from the data source to the data destination for the use case by:
configuring an ingest connector to obtain vendor data in the vendor-specific format from the data source, transforming the vendor data from the vendor-specific format to the organization-specific data destination format using the inference output, to obtain transformed data, and configuring an export connector to transmit the transformed data to the data destination; and automatically updating the data destination in real-time with vendor data through the real-time data pipeline using a publication-subscription model.

13. The method of claim 12, wherein the unstructured expression of the use case is formed as a query.

14. The method of claim 12, wherein the unstructured expression of the use case is formed as a business objective.

15. The method of claim 12, wherein the unstructured expression of the use case is formed as a description of an output.

16. The method of claim 12, wherein the unstructured expression of the use case does not include the data source.

17. The method of claim 12, wherein the real-time data pipeline includes an ingest Kafka Connector to obtain data from the data source, an export Kafka Connector to transmit data to the data destination, and a Kafka topic to store a configuration of the ingest Kafka Connector and the export Kafka Connector.

18. The method of claim 12, wherein the real-time data pipeline is a publication-subscription information sharing model with the data destination being a subscriber.

19. A non-transitory machine-readable medium comprising instructions, which when executed by a machine in an electronic online system, cause the machine to:

receive, at the electronic online system, an unstructured expression of a use case;

automatically determine, using a first trained machine-learning technique with the unstructured expression of the use case as input, a vendor-specific format and a data source to satisfy the use case;

automatically determine, using a second trained machine-learning technique with both (i) the unstructured expression of the use case and (ii) an inference output from the first trained machine-learning technique as inputs, an organization-specific data destination format and a data destination to satisfy the use case;

construct a real-time data pipeline from the data source to the data destination for the use case by:

configuring an ingest connector to obtain vendor data in the vendor-specific format from the data source, transforming the vendor data from the vendor-specific format to the organization-specific data destination format using the inference output, to obtain transformed data, and configuring an export connector to transmit the transformed data to the data destination; and automatically update the data destination in real-time with vendor data through the real-time data pipeline using a publication-subscription model.

20. The non-transitory machine-readable medium of claim 19, wherein the real-time data pipeline is a publication-subscription information sharing model with the data destination being a subscriber.

* * * * *